US010646978B2

(12) United States Patent
Zanni

(10) Patent No.: US 10,646,978 B2
(45) Date of Patent: May 12, 2020

(54) DEVICE FOR LOCKING WORKPIECES ON MACHINE TOOLS

(71) Applicant: HYDROBLOCK S.R.L., Reggio Emilia (IT)

(72) Inventor: Davide Zanni, Reggio Emilia (IT)

(73) Assignee: Hydroblock S.R.L., Reggio Emilia (IT)

( * ) Notice: Subject to any disclaimer, the term of this patent is extended or adjusted under 35 U.S.C. 154(b) by 129 days.

(21) Appl. No.: 16/074,417

(22) PCT Filed: Feb. 17, 2017

(86) PCT No.: PCT/IB2017/050920
§ 371 (c)(1),
(2) Date: Jul. 31, 2018

(87) PCT Pub. No.: WO2017/141210
PCT Pub. Date: Aug. 24, 2017

(65) Prior Publication Data

US 2019/0030686 A1 Jan. 31, 2019

(30) Foreign Application Priority Data

Feb. 19, 2016 (IT) ........................ 102016000017263

(51) Int. Cl.
*B23Q 3/00* (2006.01)
*B25B 5/06* (2006.01)
(Continued)

(52) U.S. Cl.
CPC .............. *B25B 5/062* (2013.01); *B25B 5/087* (2013.01); *B25B 5/166* (2013.01)

(58) Field of Classification Search
CPC ...................................................... B25B 1/00; B25B 1/14; B25B 1/2452; B25B 5/00; B25B 5/12
See application file for complete search history.

(56) References Cited

U.S. PATENT DOCUMENTS 4,508,327 A 4/1985 Ersoy
5,695,177 A * 12/1997 Mascola ................ B25B 5/062 269/20

(Continued)

FOREIGN PATENT DOCUMENTS

WO 2005/095047 A1 10/2005

OTHER PUBLICATIONS

International Search Report and Written Opinion dated Apr. 24, 2017 from International Patent Application No. PCT/IB2017/050920 filed Feb. 17, 2017.

*Primary Examiner* — Lee D Wilson
(74) *Attorney, Agent, or Firm* — David B. Tingey; Bryant J. Keller; Kirton McConkie

(57) ABSTRACT

The device (1) for locking workpieces on machine tools comprises:—a base body (2) fixable to a machine tool (M) and provided with an oil hydraulic cylinder (3, 4, 5); 5—a rod (8, 9) partly inserted in the oil hydraulic cylinder (3, 4, 5) slidably;—roto-translation means (14, 15, 16) designed to divide the motion of the rod (8, 9) into:—a first stretch (12) of roto-translation; and—a second stretch (13) of translation; 10—a clamp element (19, 20) associated with the rod (8, 9) and movable between:—a home configuration;—an intermediate configuration; and—an operating configuration; 15—at least a prismatic guiding body (21) associated with the base body (2) and prismatically couplable with the clamp element (19, 20) during the shifting of the rod (8, 9) along the second stretch (13).

11 Claims, 4 Drawing Sheets

(51) Int. Cl.
*B25B 5/08* (2006.01)
*B25B 5/16* (2006.01)

(56) References Cited

U.S. PATENT DOCUMENTS

| | | | | |
|---|---|---|---|---|
| 6,412,763 | B1 | 7/2002 | Noda et al. | |
| 6,435,493 | B1 | 8/2002 | Hoover | |
| 2003/0234478 | A1 | 12/2003 | Steele et al. | |
| 2006/0125167 | A1* | 6/2006 | Steele | B25B 5/087<br>269/32 |
| 2013/0334753 | A1* | 12/2013 | Stanifer | B23Q 3/069<br>269/32 |
| 2016/0151869 | A1* | 6/2016 | Dohi | B23Q 3/082<br>269/32 |
| 2019/0030686 | A1* | 1/2019 | Zanni | B25B 5/166 |
| 2019/0030687 | A1* | 1/2019 | Zanni | B25B 5/062 |

* cited by examiner

DEVICE FOR LOCKING WORKPIECES ON MACHINE TOOLS

TECHNICAL FIELD

The present invention relates to a device for locking workpieces on machine tools.

BACKGROUND ART

Suitable fixing systems are usually used for locking workpieces to be machined on a machine tool.

A particular type of fixing systems consists of a clamp which, by means of an oil hydraulic drive, is movable both in a rotating manner about an axis of rotation and in a sliding manner along the same axis of rotation.

The clamp is mounted overhanging on the rod of an oil hydraulic actuator partly inserted in an oil hydraulic cylinder.

Between the rod and the oil hydraulic cylinder there are roto-translation means, i.e. special constraint means that allow the rod, and therefore the clamp mounted on it, roto-translating.

Such fixing systems must be able to exert huge locking forces on the piece being machined.

This need is particularly felt, e.g., in the automotive sector, in which the continuous need to optimize production cycles has led to the use of tools that operate at very high speeds, discharging on the workpiece huge forces and vibrations which must be compensated by the fixing systems.

Still in the automotive sector, moreover, the use is increasingly more frequent of particularly lightweight materials such as aluminum which, nevertheless, during the machining on the machine tool, are not able to ensure the same resistance as materials such as cast iron and steel.

It is therefore necessary that the locking clamp of the workpiece, besides exercising a very high force, rests on the workpiece at predetermined points, with great precision and in a repeatable way each time a new workpiece to be machined is mounted on the machine tool; on the contrary, in fact, the high force exerted by the clamp may cause the deformation of the workpieces, which compromises the quality of the machining and the risk of getting out-of-tolerance workpieces.

In this regard the fact should also be underlined that the high forces that the clamp exerts on the workpiece lead the rod to bend and/or twist, which not only risks damaging the oil hydraulic cylinder but changes the contact area between the clamp and the workpiece, thus increasing the risk of performing faulty machining operations.

Each fixing system by roto-translating clamp is therefore characterized by its own operating curves, which put the oil pressure inside the oil hydraulic cylinder in relation with the actual locking force exerted by the clamp and with the maximum length of the clamp, i.e., with the maximum permitted overhang.

Clearly, the pressure/force curve has an increasing pattern while the pressure/length curve has a decreasing pattern and the fixing systems of known type must work in situations of compromise which are not always entirely satisfactory.

In the light of what has been said it is easy to understand that the fixing systems by roto-translating clamp are susceptible to improvements.

DESCRIPTION OF THE INVENTION

The main aim of the present invention is to provide a device for locking workpieces on machine tools which allows stably locking a workpiece to be machined on a machine tool without charging it from the tensional point of view and without deforming it.

A further object of the present invention is to provide a device for locking workpieces on machine tools which, overhang being equal, can exert higher locking forces on the workpiece being machined, and which, locking force being equal, can operate with greater overhangs.

Another object of the present invention is to provide a device for locking workpieces on machine tools which allows to overcome the mentioned drawbacks of the prior art within the ambit of a simple, rational, easy and effective to use as well as affordable solution.

The above mentioned objects are achieved by the present device for locking workpieces on machine tools having the characteristics of claim 1.

BRIEF DESCRIPTION OF THE DRAWINGS

Other characteristics and advantages of the present invention will become more evident from the description of a preferred, but not exclusive, embodiment of a device for locking workpieces on machine tools, illustrated by way of an indicative, but non-limiting example in the accompanying drawings, wherein.

EMBODIMENTS OF THE INVENTION

Figure 1:
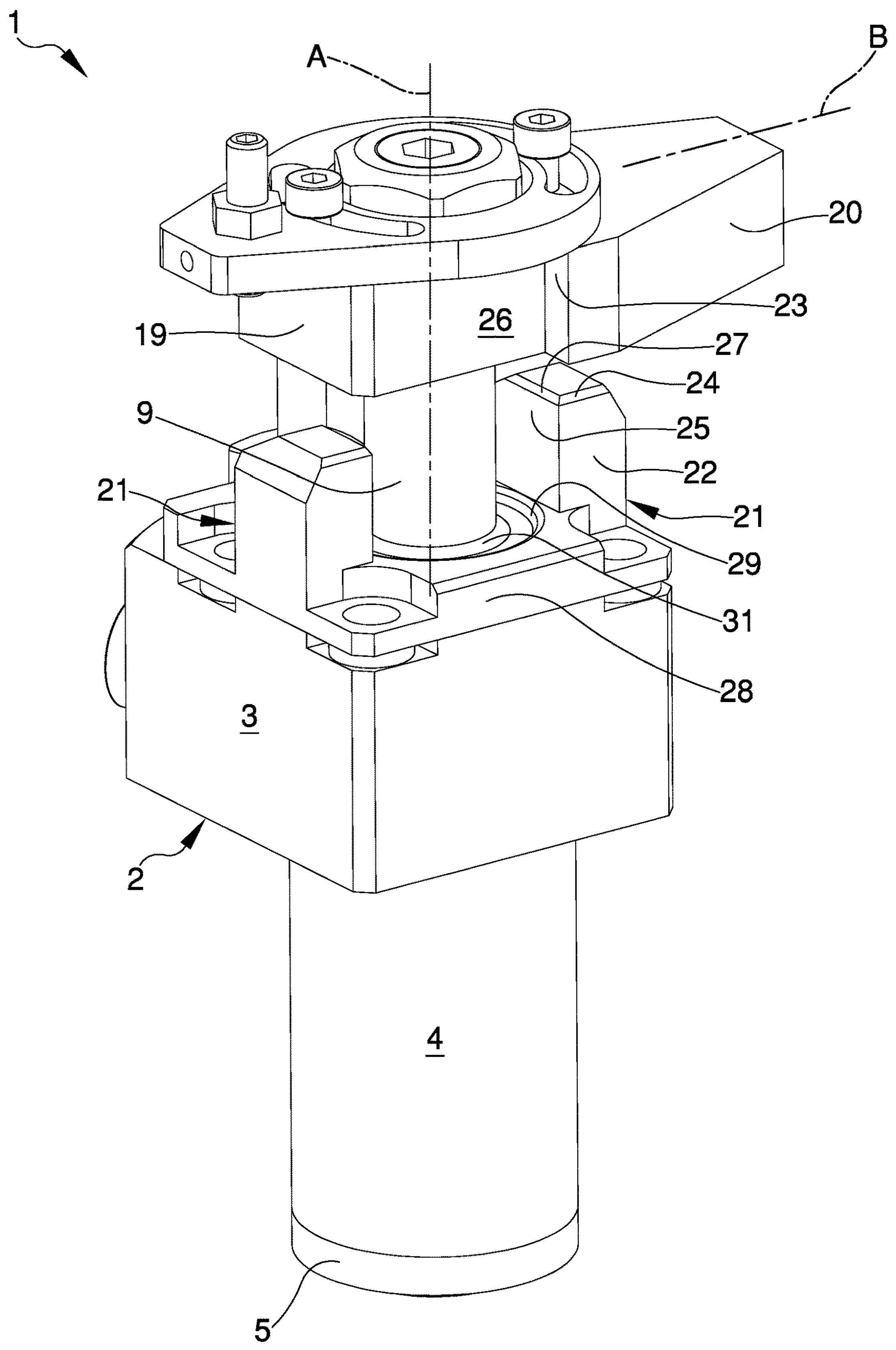
FIG. 1 is an axonometric view of the device according to the invention.
Figure 2:
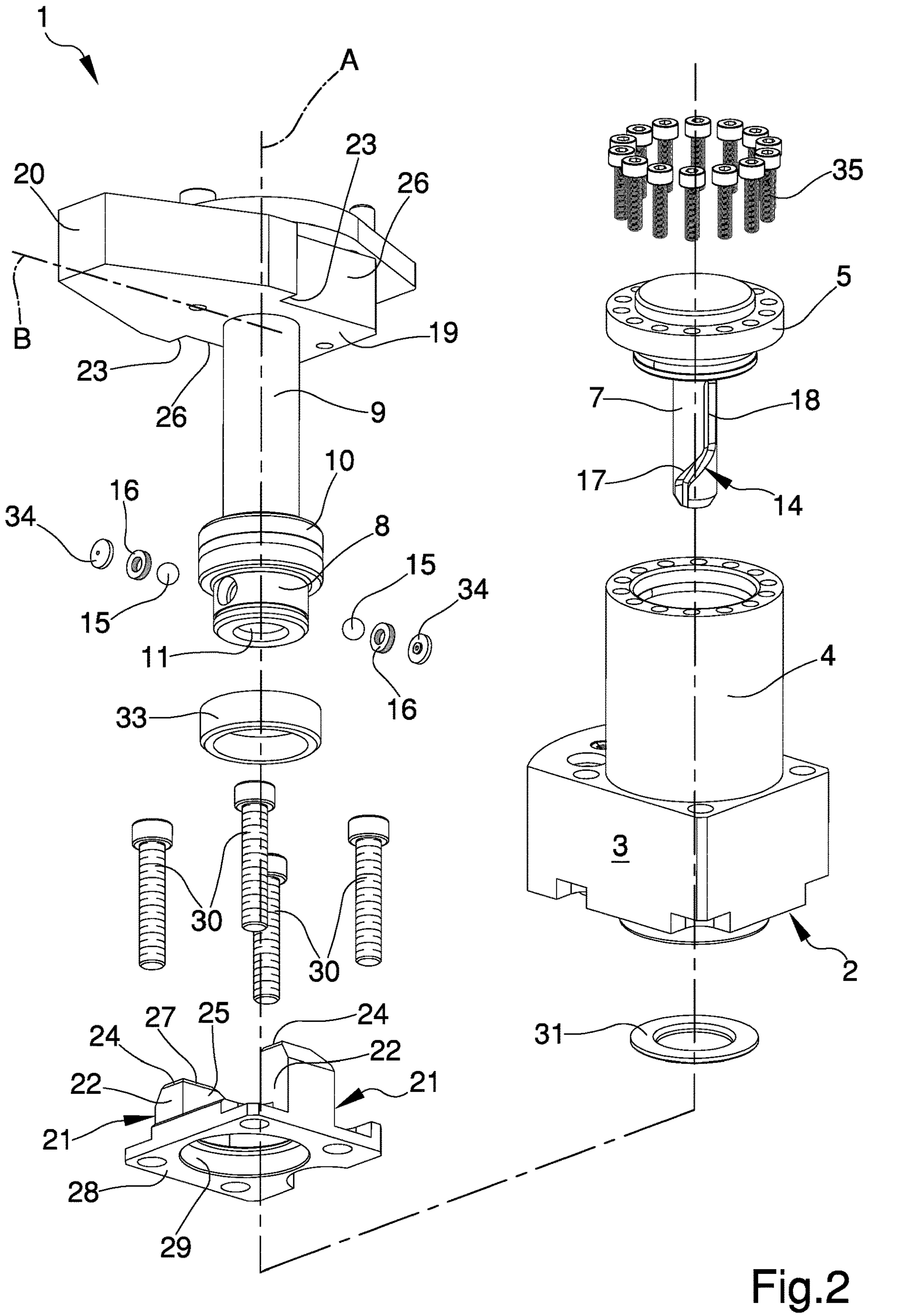
FIG. 2 is an exploded view of the device according to the invention.

With particular reference to such figures, globally indicated with 1 is a device for locking workpieces on machine tools.

The device 1, in particular, is intended to lock a workpiece P after this has been placed on a working plane L of a machine tool M and before the mechanical machining operation starts.

The device 1 comprises at least a base body 2 fixable to the machine tool M, e.g. to its working plane L, to its bedplate or to any other part of the same.

The base body 2 is provided with an oil hydraulic cylinder 3, 4, 5 containing a pressurized oil hydraulic fluid.

The oil hydraulic cylinder 3, 4, 5 is defined, e.g., by a main block 3 provided with a passage hole 6, by a hollow sleeve 4 which extends from the main block 3 and by a bottom member 5 which closes the extremity of the hollow sleeve 4 opposite the main block 3.

The hollow sleeve 4 is made e.g. in a single monolithic body with the base body 3, while the bottom member 5 is made in one or more separate bodies that are associated with the hollow sleeve 4 by means of screws 35 or other fixing means.

The bottom member 5 is provided with a pin 7 which extends inside the hollow sleeve 4 towards the main block 3.

The device 1 also comprises at least a rod 8, 9 which extends along a main axis A and is partly inserted in the oil hydraulic cylinder 3, 4, 5 in a sliding manner along the main axis A when pushed by the pressurised oil hydraulic fluid.

The rod 8, 9 comprises at least an inner portion 8 inside the oil hydraulic cylinder 3, 4, 5 and an outer portion 9 outside the oil hydraulic cylinder 3, 4, 5, from which it flows out through the passage hole 6.

The inner portion 8 is shaped to define an actuating piston 10, i.e. a thickened section part that slides to measure on the inner walls of the oil hydraulic cylinder 3, 4, 5 and divides it into two opposite chambers; the pressurized supply of the oil hydraulic fluid alternately into the two chambers allows the rod 8, 9 sliding in one direction or in the opposite direction along the main axis A.

Inside the inner portion 8 is made a cavity 11 which couples to the pin 7.

Both the pin 7 and the cavity 11 extend along the main axis A and, during the motion of the rod 8, 9 along the main axis A, the pin 7 remains always inserted at least partly into the cavity 11.

Between the oil hydraulic cylinder 3, 4, 5 and the rod 8, 9 are interposed roto-translation means 14, 15, 16 designed to divide the motion of the rod 8, 9 into:

- at least a first stretch 12 of roto-translation, in which the rod 8, 9 slides along the main axis A and rotates about the main axis A; and
- at least a second stretch 13 of translation, in which the rod 8, 9 slides along the main axis A without rotating.

The roto-translation means 14, 15, 16 comprise:

- at least one groove 14 made on at least one of the oil hydraulic cylinder 3, 4, 5 and the rod 8, 9 and having a first portion 17 that is substantially helical and a second portion 18 that is substantially straight extending parallel to the main axis A; and
- at least one engagement element 15 mounted on the other of the oil hydraulic cylinder 3, 4, 5 and the rod 8, 9 and slidably inserted in the groove 14.

The sliding of the engagement element 15 along the first portion 17 causes the motion of the rod 8, 9 along the first stretch 12 and the sliding of the engagement element 15 along the second portion 18 causes the motion of the rod 8, 9 along the second stretch 13.

In the particular embodiment of the invention shown in the figures, the groove 14 is advantageously made on the outer surface of the pin 7 while the engagement element 15 is mounted on the rod 8, 9 so as to protrude inside the cavity 11.

Even more in detail, in the particular embodiment of the invention shown in the figures the roto-translation means 14, 15, 16 comprise two grooves 14, made on opposite surfaces of the pin 7, and two engagement elements 15, mounted on opposite surfaces of the cavity 11, so as to ensure greater stability and precision during the setting in motion of the rod 8, 9.

The high accuracy in moving the rod 8, 9 is also given by the fact that the roto-translation means 14, 15, 16 comprise elastic compensation means 16 designed to push the engagement elements 15 into the grooves 14.

The elastic compensation means 16, in practice, ensure that the sliding of the engagement elements 15 into the corresponding grooves 14 always takes place with the utmost precision, even when the contact surfaces begin to suffer from wear; in other words, the elastic compensation means 16 allow to compensate for the clearance and wear between the grooves 14 and the engagement elements 15.

The elastic compensation means 16 consist, e.g., of one or more cupped (Belleville) springs housed in the rod 8, 9 and arranged so as to exert on the engagement elements 15 a force directed along a direction orthogonal to the main axis A.

In this regard it is noticed that on the rod 8, 9 is mounted a retaining ring 33 for lateral retention of the cupped (Belleville) springs 16, and a series of pads 34 interposed in radial direction between the retaining ring 33 and the cupped (Belleville) springs 16.

The pads 34 perform the function of calibrating the preload of the cupped (Belleville) springs 16 and, in addition, perform the function of end-of-stroke for the engagement elements 15 to protect the integrity of the cupped (Belleville) springs 16.

The device 1 further comprises at least one clamp element 19, 20 associated with the outer portion 9 of the rod 8, 9 for locking the workpiece P to be machined on the machine tool M.

The clamp element 19, 20 comprises:

- a proximal portion 19, which is fixed to the outer portion 9 of the rod 8, 9; and
- a distal portion 20, which extends in such a way that it projects from the proximal portion 19 along an operating line B substantially orthogonal to the main axis A and which is designed to make contact with the workpiece P.

The clamp element 19, 20 is movable between:

- a home configuration, in which the clamp element 19, 20 is at a distance from the base body 2 and, therefore, from the working plane L;
- an intermediate configuration in which, compared to the home configuration, the clamp element 19, 20 is rotated and brought nearer to the base body 2 following the motion of the rod 8, 9 along the first stretch 12; and
- an operating configuration in which, compared to the intermediate configuration, the clamp element 19, 20 is brought even nearer to the base body 2 following the motion of the rod 8, 9 along the second stretch 13 for locking the workpiece P.

The device 1 comprises at least one prismatic guiding body 21 associated with the base body 2 and prismatically coupleable to the clamp element 19, 20 during the shifting of the rod 8, 9 along the second stretch 13.

In this regard it is noticed that, in the present discussion, stating that two components "couple prismatically" means that they form a kinematic pair of prismatic type in which one of the two components can move therein with relative motion of the stiff translatory type compared to the second one, thus forming a kinematic system with one degree of freedom.

The prismatic guiding body 21 comprises at least a first guiding surface 22 substantially parallel to the main axis A and designed to make contact prismatically with a first contact surface 23 made on the clamp element 19, 20.

Figure 6:
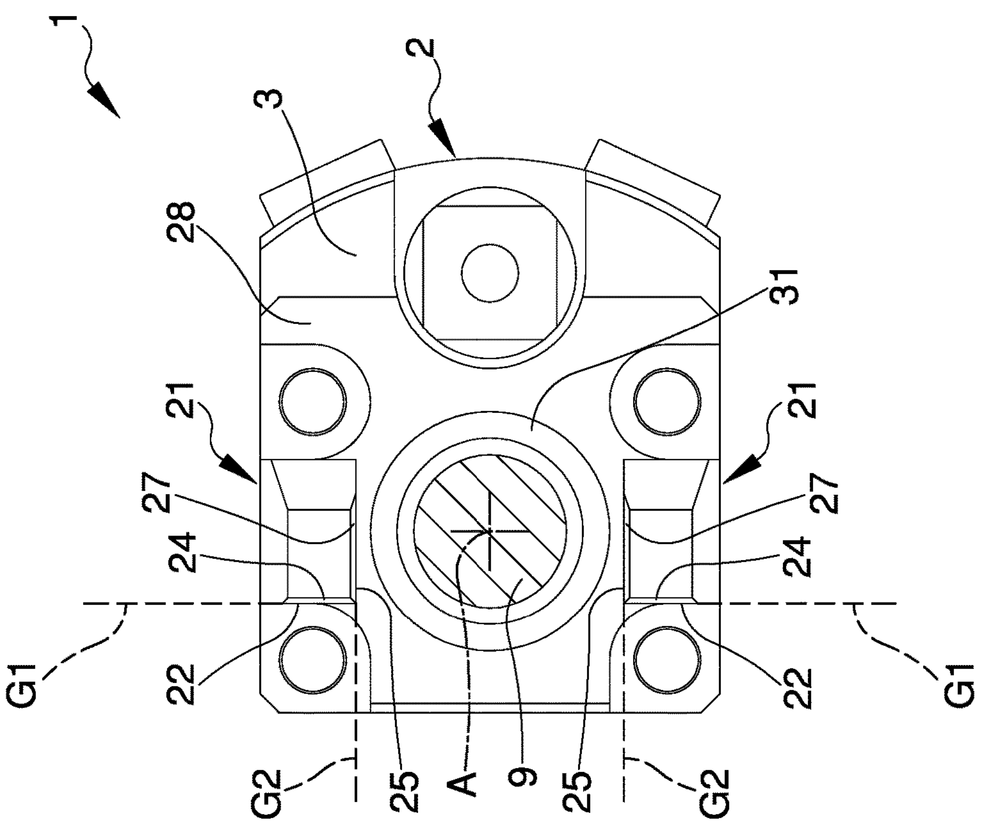
FIG. 6 is a sectional view of the device according to the invention along the plane VI-VI of FIG. 3.

The first guiding surface 22 extends in a first guiding plane G1 (visible in FIG. 6) that, besides being parallel to the main axis A, is substantially orthogonal to the operating line B when the clamp element 19, 20 is in the intermediate configuration and in the operating configuration.

In practice, when, starting from the home configuration, the clamp element 19, 20 reaches the intermediate configuration, then the first contact surface 23 made on the clamp element 19, 20 is perfectly aligned to the first guiding surface 22 of the prismatic guiding body 21 and the shifting from the intermediate configuration to the operating configuration takes place with the first contact surface 23 that slides on the first guiding surface 22.

To promote the prismatic coupling of the first guiding surface 22 with the first contact surface 23, the first contact surface 23 comprises at least a first guiding angled edge 24.

The first guiding angled edge 24 consists e.g. of a small angled surface with respect to the main axis A.

The orientation of the first guiding surface 22 which, as has been said, is substantially orthogonal to the operating line B when the clamp element 19, 20 is in the intermediate configuration and in the operating configuration, allows the prismatic guiding body 21 absorbing, and therefore reducing, part of the flexural loads C1 and of the torsional loads C2 that discharge on the rod 8, 9 when the clamp element 19, 20 comes into contact with the workpiece P.

In this regard it is noticed that, in the present discussion, by flexural loads C1 are meant the forces which tend to cause the rod 8, 9 bend about an axis orthogonal to the main axis A while by torsional loads C2 are meant the forces which tend to cause the rod 8, 9 twist about the main axis A.

The prismatic guiding body 21 also comprises at least a second guiding surface 25 substantially parallel to the main axis A and designed to make contact prismatically with a second contact surface 26 made on the clamp element 19, 20.

The second guiding surface 25 extends in a second guiding plane G2 (visible in FIG. 6) that, besides being parallel to the main axis A, is substantially parallel to the operating line B when the clamp element 19, 20 is in the intermediate configuration and in the operating configuration.

In practice when, starting from the home configuration, the clamp element 19, 20 reaches the intermediate configuration, then the second contact surface 26 made on the clamp element 19, 20 is perfectly aligned to the second guiding surface 25 of the prismatic guiding body 21 and the shifting from the intermediate configuration to the operating configuration takes place with the second contact surface 26 that slides on the second guiding surface 25.

To promote the prismatic coupling of the second guiding surface 25 with the second contact surface 26, the second contact surface 26 comprises at least a second guiding angled edge 27.

The second guiding angled edge 27 consists e.g. of a small angled surface compared to the main axis A.

The orientation of the second guiding surface 25 which, as has been said, is substantially parallel to the operating line B when the clamp element 19, 20 is in the intermediate configuration and in the operating configuration, allows the prismatic guiding body 21 absorbing, and then reducing, part of the torsional loads C2 that discharge on the rod 8, 9 when the clamp element 19, 20 comes into contact with the workpiece P.

In the particular embodiment shown in the figures, the device 1 comprises at least two prismatic guiding bodies 21 which are positioned on opposite sides of the rod 8, 9; there are therefore two first guiding surfaces 22, two first contact surfaces 23, two second guiding surfaces 25 and two second contact surfaces 26.

More in detail, the device 1 comprises at least a supporting base 28 from which both of the prismatic guiding bodies 21 rise and which is provided with a transit opening 29 for the rod 8, 9.

The supporting base 28 is mountable on the base body 2 by means of removable connecting means 30 in a mounting configuration in which the rod 8, 9 passes through the transit opening 29.

The supporting base 28 is designed to be associated with the main block 3 at the transit hole 6 and to be fitted about the second portion 18 of the rod 8, 9 which protrudes from the transit hole 6.

Alternative embodiments cannot however be ruled out in which the prismatic guiding bodies 21 are associated with the base body 2 in an integral manner, i.e. in which the prismatic guiding bodies 21 and the base body 2 are made in a single monolithic piece.

The device 1 finally comprises at least one scraping ring 31 positioned around the rod 8, 9 and retained sandwiched between the base body 2 and the supporting base 28 positioned in the mounting configuration.

The scraping ring 31 performs the function of preventing the entry of chips, dust and dirt in the transit hole 6 and is housed in an annular compartment made between the base body 2 and the supporting base 28.

Inside the annular compartment the scraping ring 31 is housed with a radial clearance 32 that allows it shifting in radial direction and adapting to any bending of the rod 8, 9.

The operation of the present invention is as follows.

The workpiece P is positioned on the working plane L with the clamp element 19, 20 arranged in the home configuration.

Figure 3:
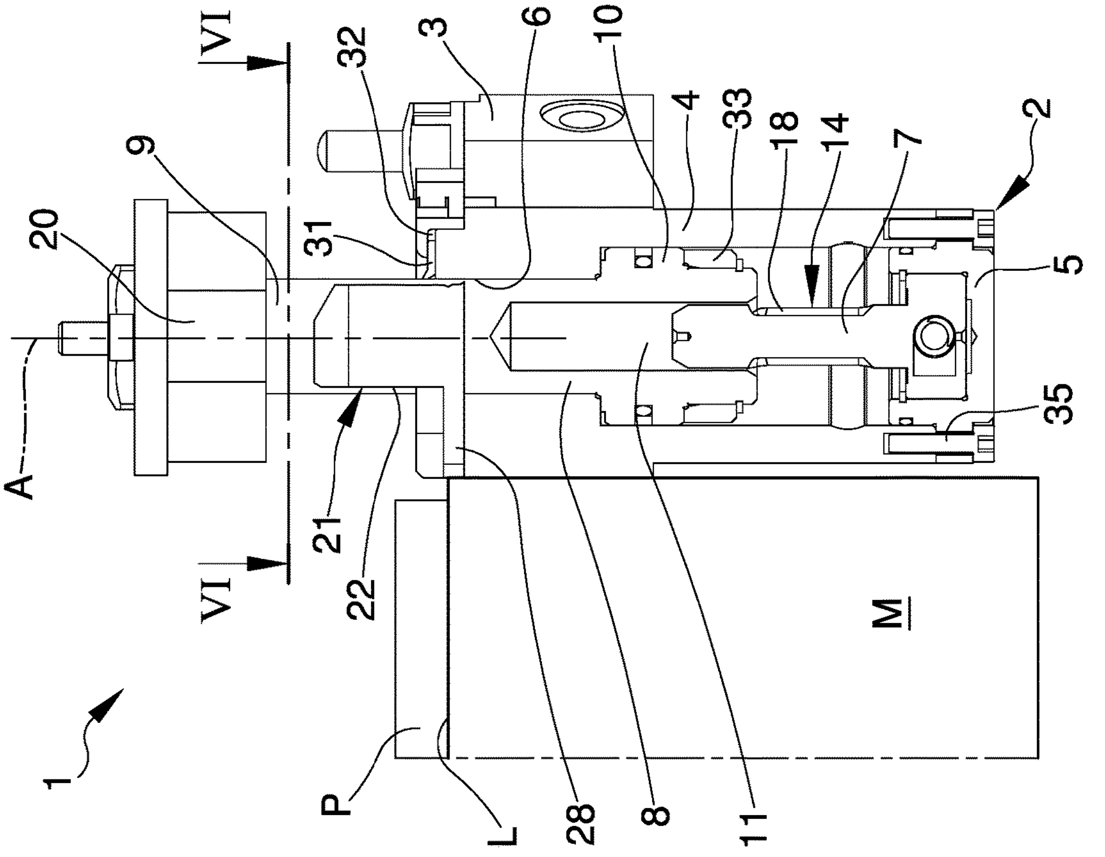
FIG. 3 is a side, partially sectional view of the device according to the invention in the home configuration.

In the home configuration, in practice, the clamp element 19, 20 leaves a surface of the working plane L clear to allow positioning the workpiece P on the machine tool M (FIG. 3).

Following the supply of the pressurized oil hydraulic fluid in the oil hydraulic cylinder 3, 4, 5, the rod 8, 9 slides inside the base body 2 along the first stretch 12 and the clamp element 19, 20 shifts from the home configuration to the intermediate configuration.

Figure 4:
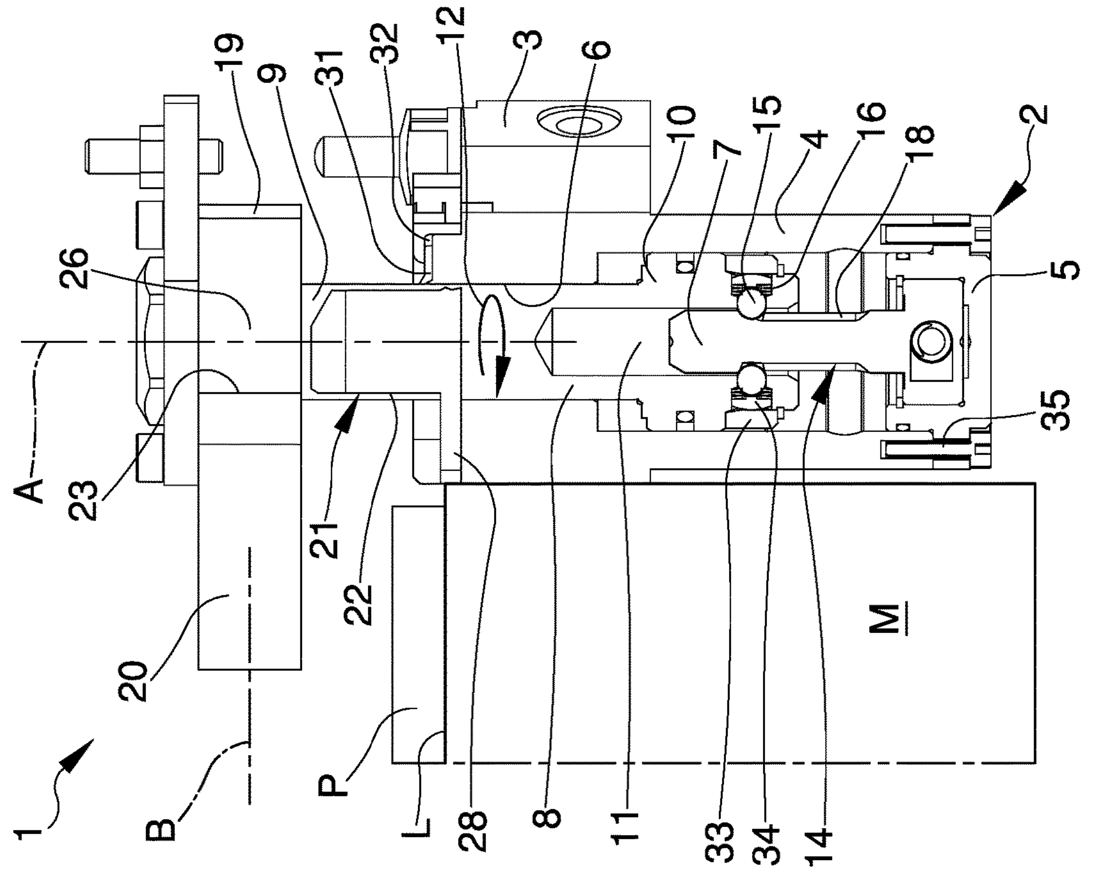
FIG. 4 is a side, partially sectional view of the device according to the invention in an intermediate configuration.

In the intermediate configuration the clamp element 19, 20 is rotated with respect to the home configuration and is positioned with the distal portion 20 overhanging on the workpiece P (FIG. 4).

The utmost operating precision of the roto-translating means 14, 15, 16 which, thanks to the elastic compensation means 16 are able to compensate for the wear of the grooves 14 and of the engagement elements 15, allows perfectly aligning the first guiding surfaces 22 and the first contact surfaces 23 in the intermediate configuration, so as to avoid binding problems when the clamp element 19, 20 passes to the operating configuration.

Once the intermediate configuration is reached, the supply of the pressurized oil hydraulic fluid inside the oil hydraulic cylinder 3, 4, 5 continues and the rod 8, 9 slides inside the base body 2 along the second stretch 13.

Figure 5:
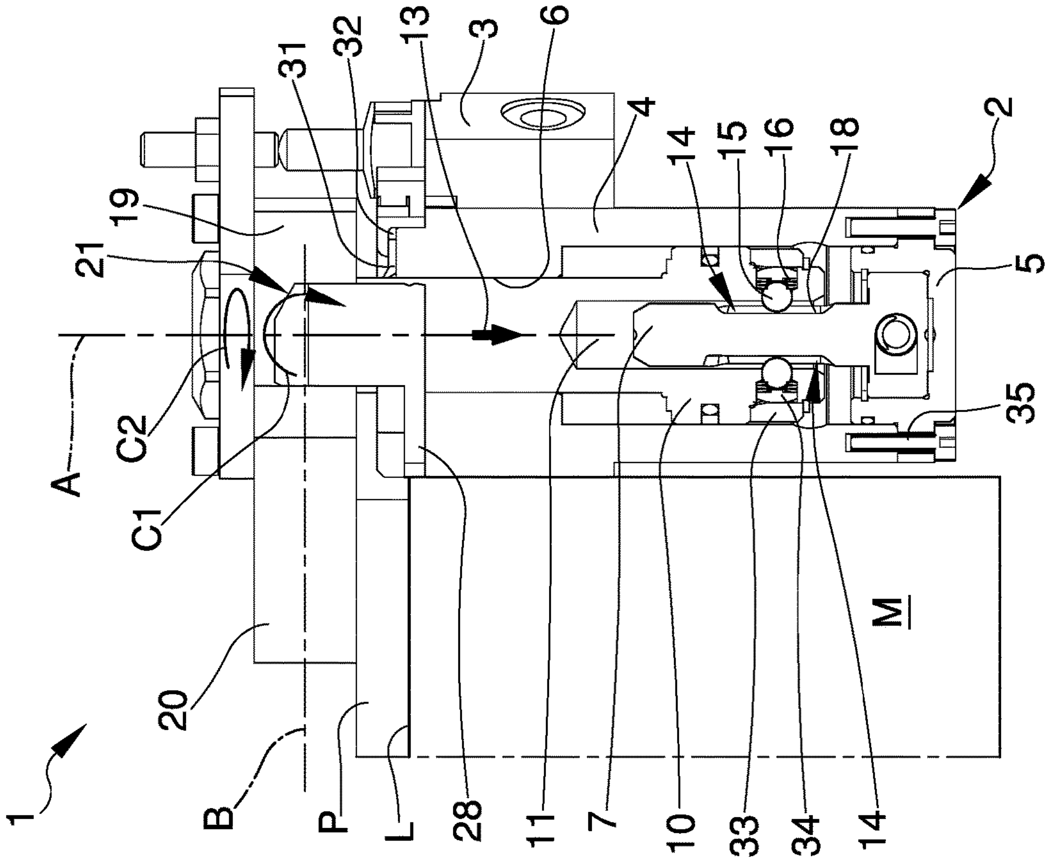
FIG. 5 is a side, partially sectional view of the device according to the invention in the operating configuration.

During the motion of the rod 8, 9 along the second stretch 13, the clamp element 19, 20 shifts from the intermediate configuration to the operating configuration in which the distal portion 20 rests on the workpiece P and locks it on the machine tool M (FIG. 5).

It has in practice been found that the described invention achieves the intended objects.

In this regard it is underlined that the particular solution to provide for a prismatic guiding body like the one according to the invention causes the device according to the invention be used to stably lock a workpiece to be machined on a machine tool without deforming it in any way.

In the operating configuration, in fact, the clamp element/rod assembly bends to a greatly reduced extent thanks to the first guiding surfaces on which the flexural loads discharge.

The stresses transmitted to the workpiece being machined are thus dramatically reduced and the piece not stressed by the bends of the clamp element can be machined with very low tolerances.

Furthermore, still in the operating configuration, the clamp element does not transmit torques to the rod thanks both to the first guiding surfaces and to the second guiding surfaces, on which possible torsional loads discharge.

This way the roto-translation means are safeguarded and their correct operation is ensured over time; this is very important in the light of the fact that, in case of damage of the roto-translation means, the stability of the clamp element, the precision with which it is moved and the locking of the workpiece would be compromised, thus promoting the origin of vibrations during machining.

The invention claimed is:

1. A device for locking workpieces on machine tools, comprising:

- at least one base body fixable to a machine tool and provided with an oil hydraulic cylinder containing a pressurised oil hydraulic fluid;
- at least one rod extending along a main axis and partly inserted in said oil hydraulic cylinder slidably along said main axis when pushed by said pressurised oil hydraulic fluid, said rod comprising at least one inner portion inside said oil hydraulic cylinder and one outer potion outside said oil hydraulic cylinder;
- roto-translation means interposed between said oil hydraulic cylinder and said rod and designed to divide the motion of said rod into:
  - at least one first stretch of roto-translation, in which said rod slides along said main axis and rotates about said main axis; and
  - at least one second stretch of translation, in which said rod slides along said main axis without rotating;
- at least one clamp element associated with said outer portion f the rod for locking a workpiece to be machined on said machine tool, said clamp element being movable between:
  - a home configuration, in which said clamp element is at a distance from said base body;
  - an intermediate configuration, in which said clamp element is rotated and brought nearer to said base body compared with said home configuration following the motion of the rod along said first stretch; and
  - an operating configuration, in which said clamp element is brought even nearer to said base body than in said intermediate configuration following the motion of said rod along said second stretch for locking said workpiece;

wherein said device comprises at least one prismatic guiding body associated with said base body and prismatically couplable with said clamp element during the shifting of said rod along said second stretch.

2. The device according to claim 1, characterised in that wherein said clamp element comprises:

- a proximal portion, which is fixed to said outer portion of the rod; and
- a distal portion, which extends in such a way that it projects from said proximal portion along an operating line substantially orthogonal to said main axis and which is designed to make contact with said workpiece.

3. The device according to claim 2, wherein said prismatic guiding body comprises at least one first guiding surface substantially parallel to said main axis and designed to make contact prismatically with a first contact surface made on said clamp element, said first guiding surface extending in a first guiding plan that is substantially orthogonal to said operating line when said clamp element is in said intermediate configuration and in said operating configuration.

4. The device according to claim 3, wherein said first guiding surface comprises at least one first guiding angled edge designed to promote prismatic coupling with said first contact surface.

5. The device according to claim 2, wherein said prismatic guiding body comprises at least one second guiding surface substantially parallel to said main axis and designed to make contact prismatically with a second contact surface made on said clamp element, said second guiding surface extending in a second guiding plane that is substantially parallel to said operating line when said clamp element is in said intermediate configuration and in said operating configuration.

6. The device according to claim 5, wherein said second guiding surface comprises at least one second guiding angled edge designed to promote prismatic coupling with said second contact surface.

7. The device according to claim 1, wherein said device comprises at least two of said prismatic guiding bodies which are positioned on opposite sides of said rod.

8. The device according to claim 7, wherein said device comprises at least one supporting base from which both of said prismatic guiding bodies rise and which is provided with a transit opening for said rod, said supporting base being mountable on said base body by means of removable connecting means in a mounting configuration in which said rod passes through said transit opening.

9. The device according to claim 8, wherein said device comprises at least one scraping ring positioned about said rod and retained sandwiched between said base body and said supporting base positioned in said mounting configuration.

10. The device according to claim 1, wherein said roto-translation means comprise:

- at least one groove made on at least one of either said rod or said oil hydraulic cylinder and comprising a first portion that is substantially helical and a second portion that is substantially straight; and
- at least one engagement element mounted on the other of either said rod or said oil hydraulic cylinder and slidably inserted in said groove;

the sliding of said engagement element along said first portion causing the motion of said rod along said first stretch and the sliding of said engagement element along said second portion causing the motion of said rod along said second stretch.

11. The device according to claim 10, wherein said roto-translation means comprise elastic compensating means designed to push said engagement element into said groove.

* * * * *